US012779806B2

(12) United States Patent
Bergmann et al.

(10) Patent No.: US 12,779,806 B2
(45) Date of Patent: Nov. 3, 2026

(54) METHOD FOR MONITORING THE QUALITY PROPERTIES OF A CELLULOSE BALE IN A BALE LINE

(71) Applicant: ANDRITZ AG, Graz (AT)

(72) Inventors: Michael Bergmann, St. Margareten im Rosental (AT); Gernot Gratzer, Stattegg (AT); Armin Konjevod, Graz (AT)

(73) Assignee: ANDRITZ AG, Graz (AT)

( * ) Notice: Subject to any disclaimer, the term of this patent is extended or adjusted under 35 U.S.C. 154(b) by 319 days.

(21) Appl. No.: 18/557,992

(22) PCT Filed: Mar. 28, 2022

(86) PCT No.: PCT/EP2022/058145
§ 371 (c)(1),
(2) Date: Oct. 30, 2023

(87) PCT Pub. No.: WO2022/233499
PCT Pub. Date: Nov. 10, 2022

(65) Prior Publication Data
US 2024/0198618 A1 Jun. 20, 2024

(30) Foreign Application Priority Data
May 6, 2021 (AT) ............................... A50347/2021

(51) Int. Cl.
*B30B 9/30* (2006.01)
*D21B 1/06* (2006.01)
(Continued)

(52) U.S. Cl.
CPC ............ *B30B 9/3007* (2013.01); *D21B 1/061* (2013.01); *D21G 9/0018* (2013.01); *G01B 11/02* (2013.01);
(Continued)

(58) Field of Classification Search
CPC ........... B30B 9/3007; G06T 7/60; G06T 7/62; G06T 7/0006; G06T 2207/20081;
(Continued)

(56) References Cited

U.S. PATENT DOCUMENTS

2016/0167411 A1* 6/2016 Chiwata ................. B65H 31/10
271/211

FOREIGN PATENT DOCUMENTS

| | | | |
|---|---|---|---|
| CN | 101369549 A | | 2/2009 |
| DE | 19909518 A1 | | 10/1999 |
| DE | 102005009835 A1 | | 9/2006 |
| JP | 2014038013 A | * | 2/2014 |
| WO | 2017071683 A1 | | 5/2017 |

OTHER PUBLICATIONS

Machine Translation of JP 2014038013 A, Ikeda, Aug. 2012 (Year: 2025).*

(Continued)

*Primary Examiner* — Veronica Martin
(74) *Attorney, Agent, or Firm* — Alix, Yale & Ristas, LLP

(57) ABSTRACT

A method for monitoring the quality characteristics of a pulp bale in a baling line of a pulp machine, wherein cut pulp sheets are stacked to form a pulp bale. Pictures of the pulp bale are taken with a camera system and are evaluated with a computer-implemented computational model for image analysis. Improved availability of the bale line is achieved.

20 Claims, 3 Drawing Sheets

(51) Int. Cl.
*D21G 9/00* (2006.01)
*G01B 11/02* (2006.01)
*G01B 11/25* (2006.01)
*G01N 21/95* (2006.01)
*G06T 7/00* (2017.01)
*G06T 7/62* (2017.01)

(52) U.S. Cl.
CPC ............. *G01B 11/25* (2013.01); *G01N 21/95* (2013.01); *G06T 7/0006* (2013.01); *G06T 7/62* (2017.01); *G06T 2207/20081* (2013.01); *G06T 2207/20084* (2013.01); *G06T 2207/30124* (2013.01)

(58) Field of Classification Search
CPC ........... G06T 2207/20084; G06T 2207/30124; D21B 1/061; D21G 9/0018; G01B 11/02; G01B 11/25; G01N 21/95
See application file for complete search history.

(56) References Cited

OTHER PUBLICATIONS

International Search Report mailed on Jul. 29, 2022 for International Patent Application No. PCT/EP2022/058145.
Tateno, Keisuke et al., "CNN-SLAM: Real-time dense monocular SLAM with learned depth prediction," Cornell University Library, Ithaca, NY, Apr. 11, 2017.
Xiao, Jianxiong et al., "Localizing 3D cuboids in single-view images," Advances in Neural Information Processing Systems 25, NIPS 2012, Dec. 3, 2012.
Karhula, P., "Using intelligent cameras in pulp production," Pulping Engineering and Environmental Recycling Sustainability Conference 2018: Technical Solutions for Today and Beyond, Portland, OR, PEERS 2018.
International Preliminary Report on Patentability dated Sep. 8, 2023 for International Patent Application No. PCT/EP2022/058145.

* cited by examiner

METHOD FOR MONITORING THE QUALITY PROPERTIES OF A CELLULOSE BALE IN A BALE LINE

BACKGROUND

The disclosed embodiments relate to a method for monitoring the geometrical properties, such as shape, of a pulp bale in a baling line of a pulp machine, wherein cut pulp sheets are stacked to form a pulp bale, and further to a pulp machine baling line with a camera system and a computer program product.

CN101369549A relates to a device and method whereby automatic image processing can be used to determine whether semiconductor chips have been stacked. A target plane must be illuminated with a visible light source.

DE102005009835A1 describes a method for the congruent depositing of press packs onto the pressing surface of a short-cycle press in the production of decorative panels, whereby suitable, possibly coloured, alignment markings are required on the edges of the press packs and similar alignment markings on the pressing surfaces.

JP2014038013A relates to a device and a method for detecting the quality of stacking of sheets. Laser light is projected linearly over the height of the stack.

WO2017071683A1 relates to a device and a method for congruent laying of workpiece layers to be pressed together in a press with a camera system for position detection of the individual workpiece layers and the individual workpiece stacks.

DE19909518A1 relates to a method for detecting the position of a stacked flat material, in particular a paper stack at the feeder of a printing machine, wherein at least one light beam is directed onto the stack side, reflected from there and evaluated as a measure of the position.

In pulp machines, the pulp produced in web form is processed into pulp sheets using longitudinal and cross cutters. In the baling line of the pulp machine, the cut pulp sheets are stacked into pulp bales, the pulp bale is compressed in a baling press and the compressed bale is packed, tied, and printed. To ensure efficient operation of the baling line, especially the bale press, the pulp bales must have sufficient quality characteristics, especially in terms of geometric properties, such as shape. For example, misshapen pulp bales, but also uneven stacking of the pulp sheets into pulp bales, cause problems in the subsequent process steps and especially in the baler. Pulp bales that do not meet the quality requirements are preferably ejected early from the baling line. Usually, the quality of the pulp bales is monitored by the operating personnel in the course of rounds, which provides subjective, discontinuous monitoring. Trends, in the sense of an increasing deterioration in the quality characteristics of the bales, may thus be detected, but not individual pulp bales of insufficient quality. For both the plant operator and the plant manufacturer, the efficient functioning of the baling line is essential, as the baling line at the end of the process chain of a pulp machine has a decisive influence on the efficiency of the entire plant.

SUMMARY

The disclosed embodiments allow an increase in the efficiency or availability of the baling line.

According to the disclosure, this is achieved in that images are taken of the pulp bale with a camera system, the images are evaluated with a computer-implemented computational model for image analysis, wherein the computational model identifies geometric elements of the pulp bale, such as corners, edges, areas, volume, shape of the pulp bale, on the images and assesses the geometric properties of the pulp bale from the identified geometric elements, wherein the computer model has been trained with a training data set and the training data set comprises training images of pulp bales and, for the individual training images, the identified geometric elements of the pulp bale and the assessment of the geometric properties of the pulp bale. A camera system is used in the bale line for data acquisition, whereby pictures are taken of the pulp bales. Advantageously, the camera system is arranged relative to the pulp bale in such a way that three surfaces of the pulp bale, e.g. two adjacent side surfaces and the top surface, are depicted in the images. A computer-implemented computational model, for example a neural network, is used for evaluation. In doing so, the computational model allows the geometric elements of the pulp bale, such as corners, edges, faces, volume, shape of the pulp bale, to be identified on the images and the geometric properties of the pulp bale to be assessed. The assessment of the geometric properties is based on the identified geometric elements of the pulp bale. The camera system comprises at least one camera but may also comprise several cameras at different locations in the bale line. For example, a camera located in the process prior to any compacting step, e.g. by a baling press, can be used to take pictures of unwrapped pulp bales. Another camera located in the process after the compacting step can take pictures of the packed pulp bales, for example. The arrangement of the camera before the compacting step for monitoring the geometric properties of the unpacked pulp bale is advantageous, as individual geometric properties of the pulp bale, in particular the shape, are strongly influenced by the compacting step. In particular, it is an objective to identify pulp bales of insufficient quality before a compacting step, e.g. in a baling press, as pulp bales of insufficient quality can be problematic, especially in the compacting step. The quality characteristics of the unpacked pulp bales include, in particular, the cutting quality of the pulp sheets, as well as, in relation to the pulp bale, its shape, squareness or stacking quality. Thus, the cutting quality depends on the condition of the cutting edges used in the longitudinal or cross cutters. Local damage to the cutting edges, for example by a nick, causes corresponding damage to the cut pulp sheet. By stacking the pulp sheets into a pulp bale, the damage reveals itself, for example, as a line on a side surface of the pulp bale or also as a local exaggeration of the bale, i.e. as a deviation of an edge of the pulp bale from a linear shape. Similarly, wear of the cutting edges can cause distortion of the shape of the pulp bale so that its shape increasingly deviates from the ideal of a cube or cuboid. Surprisingly, the embodiments thus allow conclusions to be drawn about the condition of the cross-cutters or longitudinal cutters. The stacking accuracy describes how precisely the pulp sheets are arranged on top of each other when forming the pulp bale. The more exact the arrangement of the pulp sheets, the sharper the edges, or the "smoother" the surfaces of the pulp bale. Similarly, the side surfaces of an inaccurately stacked pulp bale show increased shading or increased image noise in areas of inaccurate stacking, which can be used by the calculation model to assess the stacking accuracy.

In general, the shape or squareness of the pulp bale is important. The greater the deviations from an ideal cube-shaped or cuboid pulp bale, the greater the possible distortions in the subsequent processes, e.g. in the baler.

The quality characteristics of the packaged pulp bales include in particular the condition, folding, tying, or printing of the package. After the compacting step, e.g. in a baling press, the pulp bale is packed, for example. The condition of the packaging indicates whether the latter is intact or damaged. The pulp sheets used for wrapping ("wrapper sheets") are folded around the pulp bale, whereby an even fold represents a qualitative fold. To secure the folding, the packed pulp bales are often subsequently tied up, e.g. with a wire cord, whereby a uniform tying of the pulp bale is desired. Often the packed pulp bale is also imprinted. The assessment of the print quality includes, for example, how thoroughly the print motif was printed on the packaging of the pulp bales.

According to the disclosure, the computer-implemented computational model was trained with a training data set. The training data set includes training images of pulp bales. The training data set further comprises the identified geometric elements of the pulp bale and the assessment of the geometric properties of the pulp bale for the individual training images.

It is possible to create the training data set explicitly in the baling line of a pulp machine. For this purpose, at least one camera of the camera system is positioned in the bale line in a defined manner. The pictures of the pulp bales are always taken by the camera when the pulp bales and the camera are arranged in the defined way to each other. Therefore, the arrangement of the pulp bale in the pictures is similar. This has the advantage that a small training data set is sufficient to train the calculation model specifically for the bale line.

It is also conceivable that the training model is trained with a variety of training data sets, using images from different bale lines with different relative positioning of pulp bales to camera. In this way, the influence of the relative positioning of pulp bales to the camera on the prediction of the calculation model can be minimised. This requires extensive training of the computational model with training data sets from different bale lines, which is a longer-term process, but in turn allows immediate use of the computational model trained in this way in a bale line previously unknown to the computational model.

The training data set may also include, for example, an assessment as to whether a pulp bale shown on a training image should remain in the baling line or should be ejected from the baling line. A computational model trained in this way allows the automated ejection of pulp bales from the baling line based on the assessment by the computational model.

The method disclosed herein thus enables a continuous, automated, reproducible, objective classification of the pulp bale and its quality characteristics. In particular, the evaluation of specific quality characteristics is possible with the trained computational model.

An advantageous embodiment of the method consists of the pulp bale being moved to a defined position relative to the camera system and the camera system taking images of the pulp bale in the defined position. A possible influence from the positioning of the pulp bale to the camera on the prediction of the computational model is thus minimised, as the arrangement of the pulp bale on the images is similar. If a computational model is then explicitly trained for a bale line of a pulp machine, a training data set that is small in scope allows sufficient or fast training of the computational model.

In another advantageous embodiment of the method, a light source is used to illuminate the pulp bale, wherein the camera system takes images of the illuminated pulp bale. Illuminating the pulp bale with a light source for illumination when taking the pictures allows defined lighting conditions to be set. An influence of the lighting conditions on the prediction of the computational model is thus minimised since the lighting conditions are defined or constant and the images were created at the defined lighting conditions. This makes it possible to keep the size of the training data set small while maintaining the validity of the calculation model.

In a favourable embodiment of the method, a light source for projecting a line, in particular a coherent light source, e.g. a line laser, is used to project a line onto a surface of the pulp bale. From a distortion of the line on the surface of the pulp bale, the calculation model can assess the quality characteristics of the pulp bale, in particular the stacking accuracy or the cutting quality of the individual sheets. The stacking accuracy describes how precisely the pulp sheets are arranged on top of each other when forming the pulp bale. The less precisely the pulp sheets are arranged on top of each other to form a pulp bale, the more uneven the edges of the pulp bale, for example, or the "rougher" the surfaces of the pulp bale, which results in a greater distortion of a line projected onto a surface of the pulp bale. When using a coherent light source, e.g. a line laser, the line exactly reproduces the protrusions or recesses of the stacked pulp sheets as distortions, or jumps, of the projected line. The calculation model evaluates the distortions or jumps of the projected line and thus allows to capture the stacking accuracy. The distortion of the line can be quantified, for example, by the size and frequency of the jumps of the line projected onto the pulp bale.

In a favourable embodiment of the method the computational model has been calibrated with a calibration data set and the calibration data set comprises calibration images of pulp bales and, for the individual calibration images, a quantification of the geometric elements of the pulp bale, e.g. the length of the edge, the area, or the volume of the pulp bale. After calibration, the calculation model allows quantitative statements to be made about the pulp bale and the calculation model can issue an output, for example, the edge length, the volume, or the area of individual sides of the pulp bale. The quantification of the geometric elements on the calibration images can be done, for example, by fixing at least one and preferably two scales on one surface of the pulp bale. Particularly advantageous is that the background of the pulp bale has a calibration pattern, for example a chessboard pattern with defined dimensions.

Also disclosed is a baling line of a pulp machine comprising a camera system and means for carrying out the process steps according to the invention.

Also disclosed is a computer program product comprising instructions for carrying out the process steps in a baling line of a pulp machine.

BRIEF DESCRIPTION OF THE DRAWINGS

The invention will now be described using the examples in the drawings.

DETAILED DESCRIPTION

Figure 1:
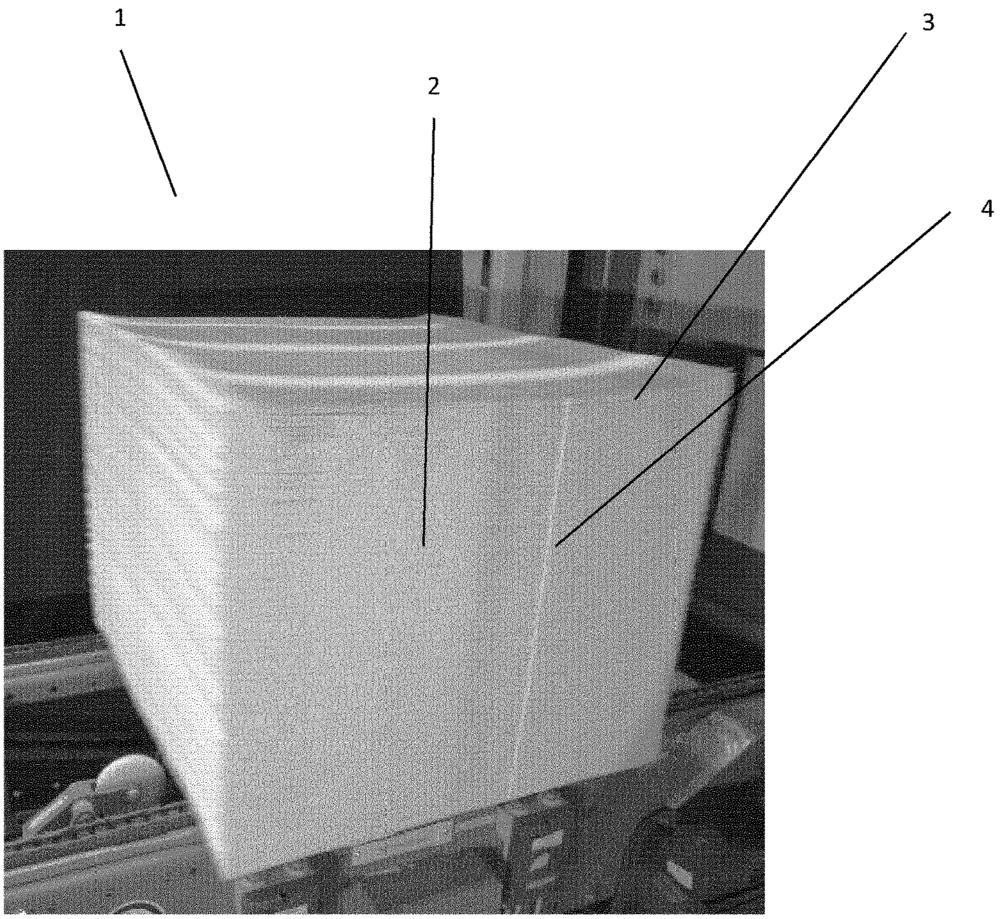
FIG. 1 shows a pulp bale in a baling line.

FIG. 1 shows an unwrapped pulp bale 1 stacked from cut pulp sheets in a baling line. The human eye can easily identify the geometric elements of the pulp bale 1, for example individual faces 2, or edges 3. According to the relative arrangement of the pulp bale 1 to the imaging camera system, three surfaces of the pulp bale are visible. With the herein described computer-implemented computational model for image analysis, the image reproduced in FIG. 1 can be evaluated. In doing so, the calculation model identifies geometric elements of the pulp bale 1 on the image, such as corners, edges 3, areas 2, volume, shape of the pulp bale, and assesses the quality characteristics of the pulp bale 1, such as the cut quality of the pulp sheets as well as the shape, squareness or stacking accuracy, based on the identified geometric elements of the unpacked pulp bale 1. FIG. 1 also shows a line 4 projected onto a surface of the pulp bale 1, wherein in this optional process step, a light source for projecting a line, in particular a coherent light source, e.g. a line laser, is used to project the line 4 onto the surface 2 of the pulp bale 1. This optional process step allows in particular an advantageous assessment of the stacking accuracy or the cutting quality of the individual sheets on the basis of the distortion of the line 4 on the surface 2 of the pulp bale 1.

Figure 2:
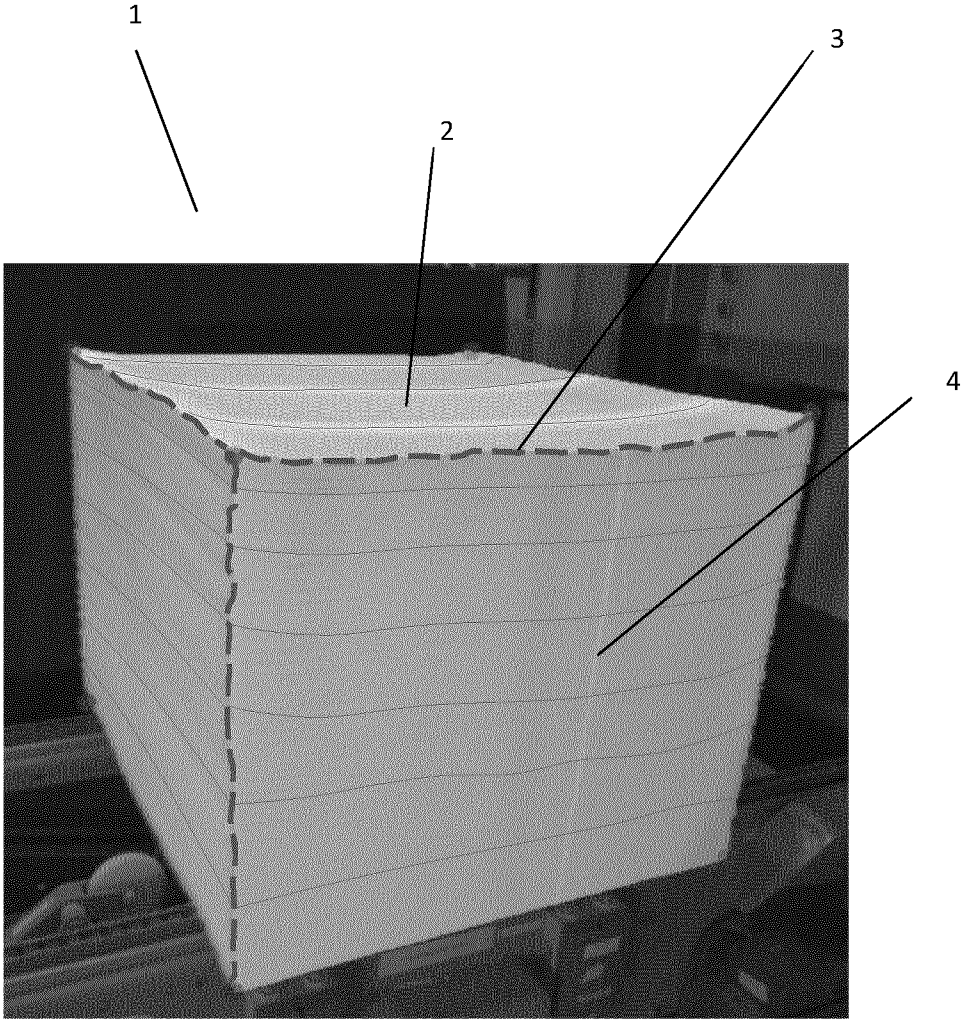
FIG. 2 shows a pulp bale with surfaces as identified by the computational model.
Figure 3:
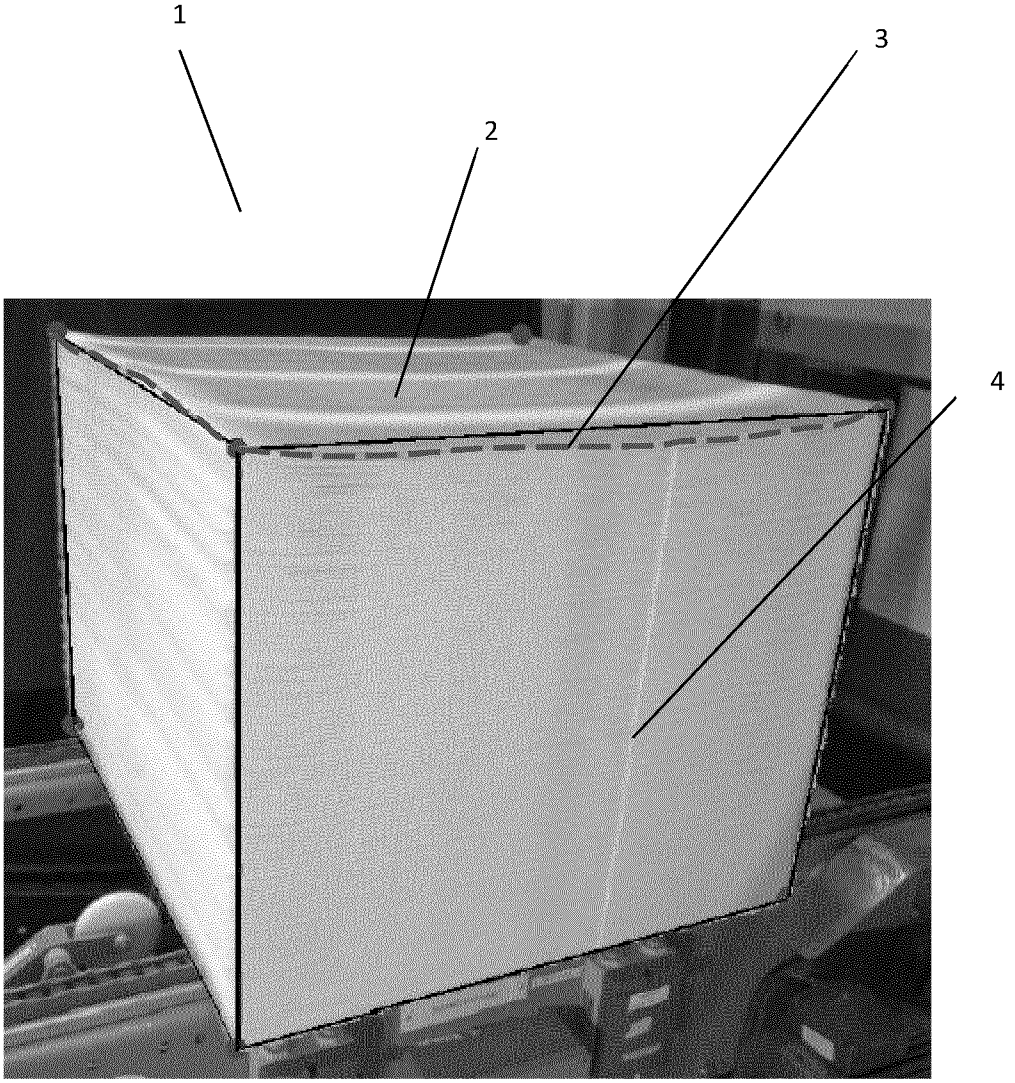
FIG. 3 shows a pulp bale with edges as identified by the computational model.

FIG. 2 shows an unpacked pulp bale 1 and the hatched areas 2 identified by the computational model with corners shown as spheres. The edges 3 as delimitation of neighbouring surfaces to each other were thus also identified by the calculation model. FIG. 3 accordingly shows the pulp bale 1 and the edges 3 identified by the calculation model and shown in dashed lines, whereby an ideal pulp bale is indicated analogous to a cube or cuboid. The calculation model thus allows monitoring of the quality characteristics, in particular the geometric properties, such as the shape or squareness, of the pulp bale 1. For example, from the shape of the edges identified by the computational model, the computational model can further assess the cut quality of the pulp sheets and the stacking accuracy of the pulp bale. By optionally using a light source to project a line onto a side surface of the pulp bale, a more accurate assessment of various quality characteristics of the pulp bale 1, such as stacking accuracy or cut quality, is possible based on the assessment of the distortion of the projected line.

The disclosed embodiments offer numerous advantages. They provide an increase in the efficiency or availability of the baling line through continuous, automated monitoring of the quality characteristics of the pulp bales. The quality of the pulp bales is monitored objectively and reproducibly, whereby pulp bales of insufficient quality, which for example have insufficient geometric properties, in particular an insufficient shape, can be ejected from the baling line at an early stage without causing problems in subsequent process steps. Conclusions can be drawn about the condition or monitoring of the condition of the cutting edges used in the longitudinal or transverse cutters.

REFERENCE NUMERALS (1) Pulp bale
(2) Surface
(3) Edge
(4) Line

The invention claimed is:

1. A method for monitoring geometrical properties of a pulp bale (1) in a baling line of a pulp machine, comprising:
cutting pulp sheets to form cut sheets and stacking the cut sheets to form a pulp bale (1);
taking images of the pulp bale (1) with a camera system;
evaluating the images with a computer-implemented computational model for image analysis, wherein
the computer-implemented computational model identifies geometric elements of the pulp bale (1) on the images, the geometric elements being selected from a group consisting of corners, edges (3), surfaces (2) and volume of the pulp bale,
the computer-implemented computational model assesses geometric properties of the pulp bale (1) from the geometric elements of the pulp bale (1) identified by the computer-implemented computational model,
the computer-implemented computational model is trained with a training data set comprising individual training images of pulp bales (1), and
for each individual training image of the pulp bales, (i) the geometric elements of the pulp bale, and (ii) the geometric properties of the pulp bale are provided.

2. The method according to claim 1, comprising
moving the pulp bale (1) to a defined position relative to the camera system, and
using the camera system to take images of the pulp bale (1) in the defined position.

3. The method according to claim 2, comprising using a light source to illuminate the pulp bale (1), wherein the camera system takes images of the pulp bale (1) illuminated by the light source.

4. The method according to claim 1, comprising
using a light source to illuminate the pulp bale (1), and
using the camera system to take images of the pulp bale (1) illuminated by the light source.

5. The method according to claim 1, comprising projecting a line (4) onto a surface (2) of the pulp bale (1) using a light source, wherein the computer-implemented computational model assesses a stacking accuracy of the pulp bale (1) or a cutting quality of individual sheets of the cut sheets from a distortion of the line (4) on a surface (2) of the pulp bale (1).

6. The method according to claim 5, wherein the light source is a line laser.

7. The method according to claim 2, comprising projecting a line (4) onto a surface (2) of the pulp bale (1) using a light source, wherein the computer-implemented computational model assesses a stacking accuracy of the pulp bale (1) or a cutting quality of individual sheets of the cut sheets from a distortion of the line (4) on a surface (2) of the pulp bale (1).

8. The method according to claim 4, comprising projecting a line (4) onto a surface (2) of the pulp bale (1) using a light source, wherein the computer-implemented computational model assesses a stacking accuracy of the pulp bale (1) or a cutting quality of individual sheets of the cut sheets from a distortion of the line (4) on a surface (2) of the pulp bale (1).

9. The method according to claim 1, wherein the pulp bale (1) is unpacked, comprising using the computer-implemented computational model to assess one or more of cut quality of the pulp sheets, shape of the pulp sheets, squareness of the pulp sheets and stacking accuracy of the pulp bale (1).

10. The method according to claim 2, wherein the pulp bale (1) is unpacked, comprising using the computer-implemented computational model to assess one or more of cut quality of the pulp sheets, shape of the pulp sheets, squareness of the pulp sheets and stacking accuracy of the pulp bale (1).

11. The method according to claim 4, wherein the pulp bale (1) is unpacked, comprising using the computer-implemented computational model to assess one or more of cut quality of the pulp sheets, shape of the pulp sheets, squareness of the pulp sheets and stacking accuracy of the pulp bale (1).

12. The method according to claim 5, wherein the pulp bale (1) is unpacked, comprising using the computer-implemented computational model to assess one or more of cut quality of the pulp sheets, shape of the pulp sheets, squareness of the pulp sheets and stacking accuracy of the pulp bale (1).

13. The method according to claim 1, wherein the pulp bale (1) is wrapped to make a package, comprising making images of the package with the camera system, and using the computer-implemented computational model to assess one or more of condition, folding, tying, and printing of the package.

14. The method according to claim 2, wherein the pulp bale (1) is wrapped to make a package, comprising making images of the package with the camera system, and using the computer-implemented computational model to assess one or more of condition, folding, tying, and printing of the package.

15. The method according to claim 4, wherein the pulp bale (1) is wrapped to make a package, comprising making images of the package with the camera system, and using the computer-implemented computational model to assess one or more of condition, folding, tying, and printing of the package.

16. The method according to claim 1, comprising calibrating the computer-implemented computational model with a calibration data set comprising a plurality of individual calibration images of pulp bales (1), and for the individual calibration images of the plurality, a quantification of geometric elements of the pulp bale (1).

17. The method according to claim 16, wherein the geometric elements of the pulp bale (1) are selected from one or more of length of an edge (3), area (2) of the pulp bale (1), and volume of the pulp bale (1).

18. A baling line of a pulp machine, comprising a camera system; and means for performing a method of monitoring geometrical properties of a pulp bale (1) in a baling line of a pulp machine, comprising:

cutting pulp sheets to form cut sheets and stacking the cut sheets to form a pulp bale (1);

taking images of the pulp bale (1) with the camera system;

evaluating the images with a computer-implemented computational model for image analysis, wherein the computer-implemented computational model identifies geometric elements of the pulp bale (1) on the images, the geometric elements being selected from a group consisting of corners, edges (3), surfaces (2) and volume of the pulp bale, the computer-implemented computational model assesses geometric properties of the pulp bale (1) from the geometric elements of the pulp bale (1) identified by the computer-implemented computational model, the computer-implemented computational model is trained with a training data set comprising individual training images of pulp bales (1), and for each individual training image of the pulp bales, (i) the geometric elements of the pulp bale, and (ii) the geometric properties of the pulp bale are provided.

19. A computer program product, comprising:

instructions for causing a baling line of a pulp machine having a camera system to perform a method of monitoring geometrical properties of the pulp bale (1) in the baling line of a pulp machine, comprising:

cutting pulp sheets to form cut sheets and stacking the cut sheets to form a pulp bale (1);

taking images of the pulp bale (1) with the camera system;

evaluating the images with a computer-implemented computational model for image analysis, wherein the computer-implemented computational model identifies geometric elements of the pulp bale (1) on the images, the geometric elements being selected from a group consisting of corners, edges (3), surfaces (2) and volume of the pulp bale, the computer-implemented computational model assesses geometric properties of the pulp bale (1) from the geometric elements of the pulp bale (1) identified by the computer-implemented computational model, the computer-implemented computational model is trained with a training data set comprising individual training images of pulp bales (1), and for each individual training image of the pulp bales, (i) the geometric elements of the pulp bale, and (ii) the geometric properties of the pulp bale are provided.

20. The computer program product of claim 19, wherein the computer-implemented computational model comprises a neural network.

* * * * *